United States Patent
Davis et al.

(10) Patent No.: US 12,050,554 B2
(45) Date of Patent: Jul. 30, 2024

(54) SYSTEMS AND METHOD FOR ELECTRONIC DISCOVERY MANAGEMENT

(71) Applicant: ConocoPhillips Company, Houston, TX (US)

(72) Inventors: Clinton A. Davis, Houston, TX (US); Crystal J. Westfall, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 0 days.

(21) Appl. No.: 16/911,875

(22) Filed: Jun. 25, 2020

(65) Prior Publication Data

US 2021/0406219 A1    Dec. 30, 2021

(51) Int. Cl.
| | |
|---|---|
| *G06F 16/9535* | (2019.01) |
| *G06F 9/48* | (2006.01) |
| *G06F 16/11* | (2019.01) |
| *G06F 16/16* | (2019.01) |
| *G06F 16/182* | (2019.01) |
| *G06F 16/951* | (2019.01) |
| *G06F 21/60* | (2013.01) |

(52) U.S. Cl.
CPC ............ *G06F 16/16* (2019.01); *G06F 9/4881* (2013.01); *G06F 16/122* (2019.01); *G06F 16/1827* (2019.01); *G06F 21/602* (2013.01)

(58) Field of Classification Search
CPC ...... G06F 16/16; G06F 9/4881; G06F 21/602; G06F 16/1827; G06F 16/122; G06F 2221/2111

See application file for complete search history.

(56) References Cited

U.S. PATENT DOCUMENTS

| | | | |
|---|---|---|---|
| 6,421,676 B1 * | 7/2002 | Krishnamurthy ... | G06F 16/2471 |
| 10,909,198 B1 * | 2/2021 | Gharmalkar ...... | G06F 16/24578 |
| 2010/0250624 A1 * | 9/2010 | Mayer ................... | H04L 51/046 |
| | | | 707/809 |
| 2011/0040748 A1 * | 2/2011 | Williams .............. | G06F 16/972 |
| | | | 707/E17.014 |
| 2011/0320480 A1 * | 12/2011 | Kisin ..................... | G06Q 50/18 |
| | | | 707/769 |
| 2016/0062991 A1 * | 3/2016 | Reilly ..................... | G06F 16/93 |
| | | | 713/165 |

(Continued)

*Primary Examiner* — Apu M Mofiz
*Assistant Examiner* — Oscar Wehovz
(74) *Attorney, Agent, or Firm* — Polsinelli PC

(57) ABSTRACT

Implementations described and claimed herein provide systems and methods for electronic discovery management. In one implementation, a staging path from source(s) to a staging area in a target location is generated automatically in connection with a collection request. Criteria for the collection request is obtained automatically and an encrypted export key for the collection request is captured using first robot(s). An export of a responsive data collection is obtained automatically from the source(s) using the first robot(s). The responsive data collection is exported along the staging path based on the criteria and the encrypted export key. An image of the responsive data collection is generated in the target location by sending parameter(s) to second robot(s), and the collection request is fulfilled by triggering a compression of the image of the responsive data collection into forensic container(s) using the second robot(s).

18 Claims, 5 Drawing Sheets

(56) References Cited

U.S. PATENT DOCUMENTS

2016/0321767 A1* 11/2016 Taylor ................... G06F 16/22
2017/0262520 A1*  9/2017 Mitkar ................. G06F 16/275
2020/0401572 A1* 12/2020 Mutha ................... G06Q 50/18

* cited by examiner

SYSTEMS AND METHOD FOR ELECTRONIC DISCOVERY MANAGEMENT

BACKGROUND

I. Technical Field

Aspects of the present disclosure relate generally to systems and methods for electronic discovery management and more particularly to generating responsive data collections in electronic discovery using robots.

II. State of the Art

Business environments typically utilize an infrastructure having various disparate interconnected data sources. For example, cloud-based software as a service products for business environments are common. Such platforms may integrate online services into cloud services incorporating e-mail, internal social networking, collaboration, website hosting, internal and external communication, conferencing, Voice over Internet Protocol (VoIP), file hosting, and/or other services. In instances where collection of data underlying or otherwise corresponding to these various services is desired, for example in connection with legal litigation or arbitration, significant resources are conventionally diverted from business activity. More particularly, many conventional systems involve unique interfaces for different services that are each time consuming and tedious to traverse through to obtain underlying data. These challenges are exacerbated when a myriad of particular data collections responsive to specific requests is desired. It is with these observations in mind, among others, that various aspects of the present disclosure were conceived and developed.

SUMMARY

Implementations described and claimed herein address the foregoing problems by providing systems and methods for electronic discovery management. In one implementation, a staging path from at least one source to a staging area in a target location is generated automatically in connection with a collection request. Criteria for the collection request is obtained automatically using a first robot, and an encrypted export key for the collection request is captured using the first robot. An export of a responsive data collection is obtained automatically from the at least one source using the first robot. The responsive data collection is exported along the staging path based on the criteria for the collection request and the encrypted export key. An image of the responsive data collection is generated in the target location by sending one or more parameters to a second robot, and the collection request is fulfilled by triggering a compression of the image of the responsive data collection into one or more forensic containers using the second robot.

In another implementation, a staging path from at least one source to a staging area in a target location automatically generated in connection with a collection request is obtained. Criteria for the collection request and an encrypted export key are captured automatically using one or more first robots. An automated export command for collecting a responsive data collection from the at least one source is generated using the one or more first robots. The automated export command is generated using the criteria for the collection request and the encrypted export key, and the responsive data collection is downloaded along the staging path in response to the automated export command. An automated image command for generating an image of the responsive data collection in the target location is generated using one or more second robots, the automated image command generated based on an image path, the collection request fulfilled by triggering a compression of the image of the responsive data collection into one or more forensic containers using the one or more second robots.

In yet another implementation, memory includes a staging area in a target location. A staging path from at least one source to the staging area in the target location is automatically generated in connection with a collection request. One or more first robots capture criteria for the collection request and an encrypted export key automatically, and the one or more first robots generate an automated export command for collecting a responsive data collection from the at least one source. The automated export command is generated using the criteria for the collection request and the encrypted export key, and the responsive data collection is downloaded along the staging path in response to the automated export command. One or more second robots generate an automated image command for generating an image of the responsive data collection in the target location. The automated image command is generated based on an image path, and the collection request is fulfilled by triggering a compression of the image of the responsive data collection into one or more forensic containers.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the present disclosure involve systems and methods for electronic discovery management. Generally, the presently disclosed technology utilizes robots and automation to facilitate electronic discovery from aspects of cloud-based software as a service products to generate responsive data collections from disparate sources across the platform. In one aspect, a first set of robots and automation are utilized to generate responsive data collections by accessing an interface of the cloud-based software as a service products platform to lookup criteria, capture an encrypted download key, and collect data through downloads to an automatically generated staging path. Once a download is complete, an image is created by sending parameters to a second set of robots, which launches an application for compressing data into forensic containers, all while reporting statuses to a tracking database for process orchestration. The sets of robots may include one or more robots depending on a volume of the collection request.

The presently disclosed technology significantly improves electronic discovery technology by facilitating collection across disparate services in cloud-based platforms, while ensuring that valuable business resources are not diverted from regular business activities to perform time intensive operations in generating responsive data collections. Overall, the presently disclosed technology improves electronic discovery technology through: improved efficiency and time savings; automated error notifications for support and calculated retries; reduction in human error; scalability for different volumes of collection requests; dynamic coding that adapts to website changes with nominal process disruption; independent operation without human monitoring; increased defensibility of the collections; employee full-time equivalent reductions; and/or the like. Other advantages will be apparent from the present disclosure.

Figure 1:
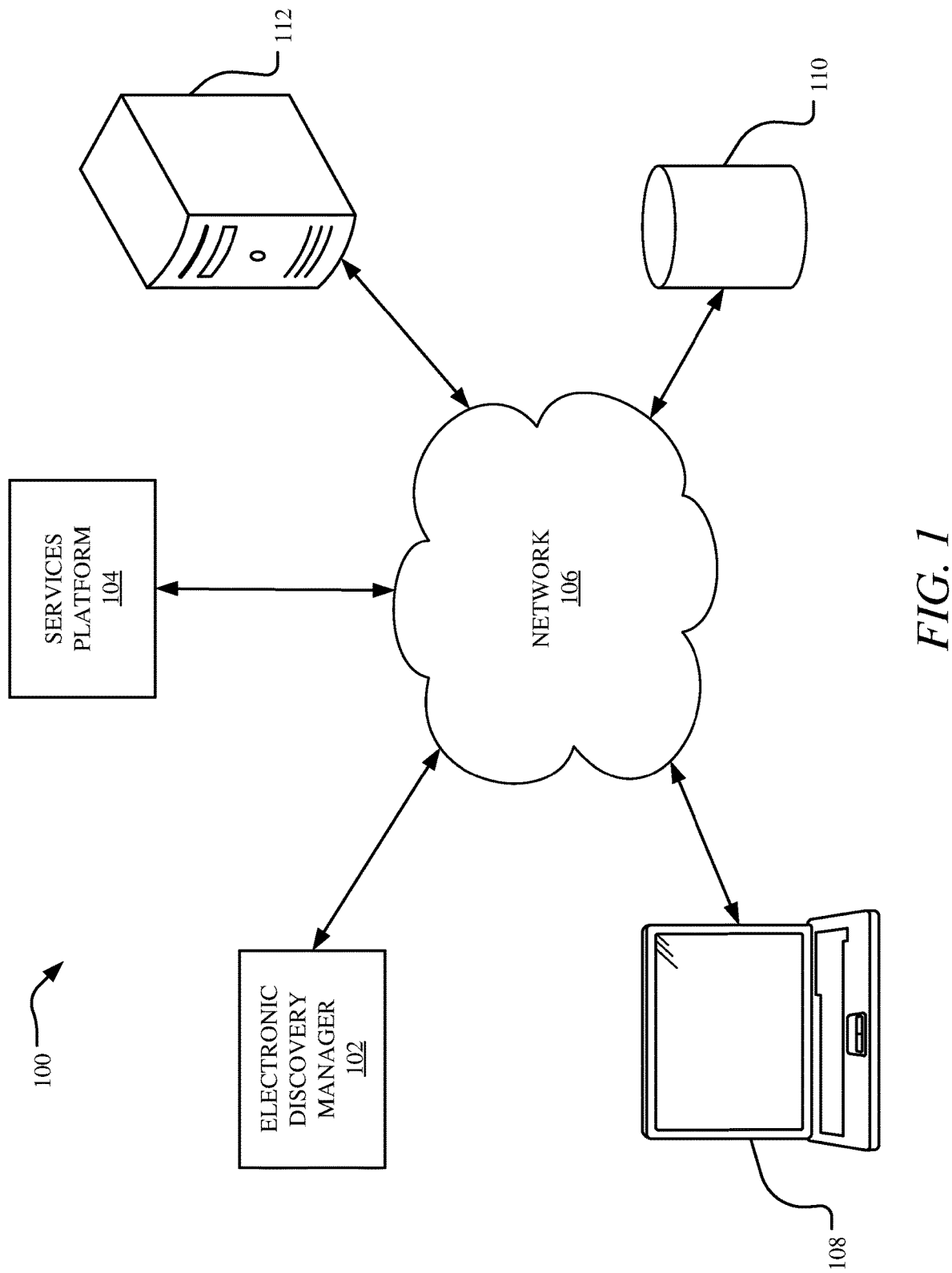
FIG. 1 illustrates an example network environment for electronic discovery management.

To begin a detailed discussion of an example network environment 100 for electronic discovery management, reference is made to FIG. 1. As can be understood from FIG. 1, an electronic discovery manager 102 accesses and interacts with various services of a cloud-based software as a service products platform 104 over a network 106.

The network 106 is used by one or more computing or data storage devices for implementing the presently disclosed technology. In one implementation, various components of electronic discovery manager 102, the platform 104, one or more user devices 108, one or more databases 110, and/or other network components or computing devices described herein are communicatively connected to the network 106. Examples of the user devices 108 include a terminal, personal computer, a smart-phone, a tablet, a mobile computer, a workstation, and/or the like. The user devices 108 may be used in connection with accessing or otherwise interacting with the various services of the platform 104, the electronic discovery manger 102, and/or other services.

A server 112 may host the system. In one implementation, the server 112 also hosts a website or an application that users may visit to access the services of the electronic discovery manager 102. The server 112 may be one single server, a plurality of servers with each such server being a physical server or a virtual machine, or a collection of both physical servers and virtual machines. In another implementation, a cloud hosts one or more components of the system. The electronic discovery manager 102, the user devices 108, the server 112, and other resources connected to the network 106 may access one or more additional servers for access to one or more websites, applications, web services interfaces, and/or other services, such as those corresponding to the platform 104 or that are used for electronic discovery management. In one implementation, the server 112 also hosts a search engine that the electronic discovery manager 102 uses for accessing and modifying information, including without limitation, the collection requests, tracking reports, criteria, automation, and/or the like.

The platform 104 may integrate online services into cloud services incorporating e-mail, internal social networking, collaboration, website hosting, internal and external communication, conferencing, Voice over Internet Protocol (VoIP), file hosting, and/or other services. For example, the platform 104 may include the line of services included in the Microsoft® Office 365 cloud-based platform. Conventionally, to obtain data underlying the services for a business, the platform 104 provides a series of menus and interfaces that are accessed via the network 106 with the user device 108 and tediously iterated through in a time intensive process, thereby diverting valuable business resources. Accordingly, electronic discovery manager 102 utilizes robots and automation to facilitate electronic discovery in generating responsive data collections from disparate sources across the platform 104.

In one implementation, the electronic discovery manager 102 obtains incoming data from an automation database query, which may be triggered via a task automation and configuration management framework utilizing scripting language and a corresponding command-line shell. The electronic discovery manager 102 parses a data object and extracts and assigns variables for use in connection with a collection request. The data object may be a JavaScript Object Notation (JSON) object or an object utilizing other file and data interchange formats.

The electronic discovery manager 102 launches an electronic discovery site associated with the platform 104 and enters a ticket identification into a search field and refreshes. In response, if an open button is found, the electronic discovery manager 102 selects an exports tab on the electronic discovery site and determines if an exported by an administrator entry exists. If so, the electronic discovery manager 102 selects the entry, prompting navigation to a download page. The electronic discovery manager 102 determines if a download results link is present, and if so, the electronic discovery manager 102 copies the link and assigns a value to a download key variable. The electronic discovery manager 102 determines if the download key variable is greater than zero, and if so, the electronic discovery manager 102 replaces all double backslashes with a single backslash in a corresponding download path.

Following optimization of the download path, a command line interpreter is initiated in connection with the collection, and removes the drive associated with the download path. If the electronic discovery manager 102 determines that the command prompt is completed successfully, the electronic discovery manager 102 selects a link to download results. After following the link to download the results, the electronic discovery manager 102 provides the download key and the drive for the download path and triggers the download.

After triggering the download, the electronic discovery manager 102 determines whether corrupted or existing data is present. If there is corrupted or existing data present, the electronic discovery manager 102 selects an option to overwrite the download location with new data. Following the selection of the overwrite option or if there was no corrupted or existing data present, the electronic discovery manager 102 determines whether a stop button exists. If the stop button does not exist, the electronic discovery manager 102 waits a predetermine amount of time (e.g., 15 seconds). Once the electronic discovery manager 102 detects the stop button, the electronic discovery manager 102 determines whether the button says "Close." If so, the electronic discovery manager 102 selects the button for all corresponding boxes (e.g., three boxes). At this point, the electronic discovery manager 102 unmaps the drive associated with the download and closes all corresponding applications to end the collection of data.

Figure 2:
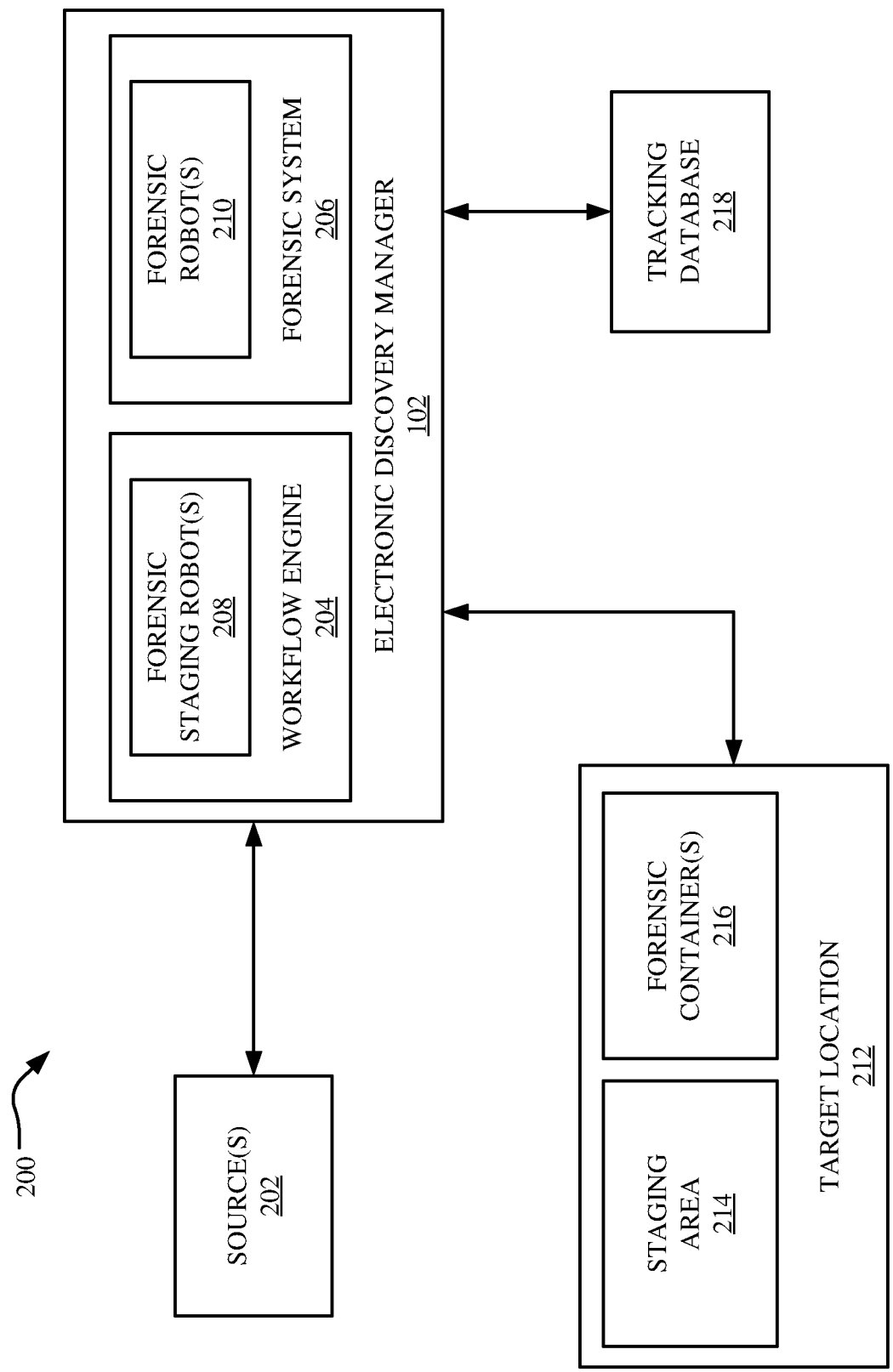
FIG. 2 shows a block diagram of an example electronic discovery management system.

Turning to FIG. 2, an example electronic discovery management system 200 implemented by the electronic discovery manager 102 is illustrated. In one implementation, the electronic discovery manager 102 generates responsive data collections from one or more sources 202 across the platform 104 in connection with collection requests.

It will be appreciated that different hardware may be deployed for implementing the system 200. The electronic discovery manager 102 includes a workflow engine 204 and a forensic system 206. Various servers associated with a business may include a server name and database schema where database environment accounts may be used by the workflow engine 204 to connect to the databases for data collections. Similarly, the workflow engine 204 includes various servers and a password vault managed account to access data sources of the platform 104 for collection.

In one implementation, the workflow engine 204 includes a set of one or more forensic staging robots 208, and the forensic system 206 includes a set of one or more forensic robots 210. The robots 208 and 210 may be robots deployed in a Virtual Desktop Infrastructure (VDI) environment to automate export and forensic container processes, as well as to run a forensic imager application that obtains data in a forensically sound manner (i.e., without making changes to the original data). The data is exported from the source 202 to a target location 212 using the robots 208 and 210. Based on the point in the export and forensic container process, the data may be directed to a staging area 214, one or more forensic containers 216, and/or other areas within the target location 212, such as within a folder hierarchy, as detailed herein.

It will be appreciated that the number of robots in each of the sets may vary depending on a volume or number of collection requests. For example, the forensic staging robots 208 may include a plurality of robot deployed in connection with different VDIs or for different tasks, and the forensic robots 210 may be deployed in groups, each with one in a primary role and one in a backup role. To track the progress of generating a responsive data collection and the progress of the workflow engine 204 and the forensic system 206, a tracking database 218 may store one or more reports generated during the process.

In one implementation, the staging area 214 is created. Folders are populated prior to collection with the folder structure being where the workflow engine 206 will copy data to in connection with a collection request. More particularly, a matter folder is created and named according to a standardized naming pattern after confirming that the matter folder does not already exist by searching a root staging directory. In connection with collection request, a plurality of folders within a folder hierarchy in the target location 212 are created. The plurality of folders may include a request folder with a staging folder and an image folder within the request folder. The staging folder may be associated with the staging area 214 and the image folder may be associated with the forensic containers 216. If a collection request is being re-run, the folders are not recreated, but data in the staging folder is removed to prevent duplicate data. In connection with the collection request, variables are gathered from an automation job table, including collection matter, custodian user identification, custodian device type, and/or the like.

A staging path is generated from the source 202 to the staging area 214. In other words, a root staging location to export data to in the target location 212 is created. In one implementation, the workflow engine 204 verifies that the paths are valid for on premise data storage locations and for online service data storage locations. In connection with on premise data storage locations, such as private encrypted storage drives and shared storage drives, the workflow engine 204 verifies the path is valid prior to writing a job corresponding to the collection request to the automation job table. In verifying the path, the workflow engine 204 determines whether the path is corrupt. Examples of a corrupted path include where a space is inserted in the path, a name of the folder changed prior to collection, the folder was deleted, and/or the like. If there are multiple paths listed, the workflow engine 204 concatenates them with a semicolon or other predesignated character in the automation job table. In one implementation, in connection with verification of the path, the workflow engine 204 responds with a Pass/Fail. The path may be verified using the password vault for the on premise data storage locations. For online service data locations associated with the platform 104, the workflow engine 204 may validate the path based on device type and to ensure the path is not null.

Data collected from the source 202 against the target location 212 is documented to ensure that the data was copied without issue. More particularly, quality control reports are generated specifying a source file size (e.g., in MB) and a source file count in connection with a collection request. A log file may be generated for file share data sources, and for sources associated with the platform 104, export summaries may be produced, which include any errors or warnings.

As described herein, the electronic discovery manager 102 may obtain responsive data collections from the sources 202 that may involve various device types, such as on premise data storage locations and online service sources associated with the platform 104. In some cases, such as for the online services sources associated with the platform 104, the device is coded to enable authorization of collection in a ticket menu. The path from the ticket menu passes the location to collection to the workflow engine 204. Stated differently, in the ticket menu, a ticket identification is listed with a device identification, a device type, a path, and additional ticket details, such as matter, priority, collection deadline, working group, actions post collection, relevance, and/or the like.

The workflow engine 204 may generate an authorized collections overview, broken down by device type. For private and shared drive device types, the authorized collections overview may include a staging status indicating whether the folder structure was created without issue and a job status indicating whether the data copy procedure was executed without errors noted in log files. For online sources, the authorized collections overview may include a staging status indicating whether the folder structure was created without issue and a job status indicating whether the search status is complete, an export ready status is complete, and/or the like. In some cases, a file associated with the online file drives may include various versions. As such, an attribute indicating if a document version history should be exported or if just the most recent version should be exported is included. In the authorized collections overview an option is provided for designating whether to include the document version history, which may include a warning that the number of files and data size may be significantly increased.

In one implementation, targeted collections are generated that are responsive to collection requests. The targeted collections may involve e-mail, online drives, and/or other file types or device types. With respect to e-mail, the path is obtained by the workflow engine 204, and the collection is structured according to folders within the e-mail folder hierarchy (e.g., Inbox, Sent, etc.) or as a full collection associated with the custodian. For a specific folder collection, variables are read when the collection is authorized by the electronic discovery manager 102, and the electronic discovery manager 102 determines whether the collection request is a folder level collection request by detecting whether a path exists after the top level domain for the e-mail. A text file is generated with all folder names for the e-mail top level folder (e.g., Inbox) to find the unique folder identification. The unique folder identification is used as filter criteria to filter on the mailbox folder. A new case is created, a new search is created using the custodian associated with the e-mail as the source 202 and the unique folder identification as the query to filter only on the mailbox folder. The export record is created.

Similarly, for online services of the platform 104, such as file hosting, the path is obtained by the workflow engine 204, and the collection is structured according to file folders or as a full collection associated with a custodian. For a specific folder collection, variables are read when the collection is authorized by the electronic discovery manager 102, and the electronic discovery manager 102 determines whether the collection request is a folder level collection request by detecting whether a path exists after the top level domain. The path property is used as the query with the path property as the filter for folders. A new case is created, a new search is created using the custodian as the source 202 and the path as the query to filter on the online folder. The export record is created.

In one implementation, for targeted collections documentation, a script is run to determine if the collection request is for a full collection or a targeted collection. If the collection request is for a targeted collection, variables are feed into a targeted collection procedure compilation. Depending on the source 202 (e.g., whether the source 202 is e-mail or online file drives, when a targeted collection is executed, either a folder list or a data link list is generated and placed in the request identification location. In some cases, newest folders up to a threshold are included in the extract and saved as a text file to the log location. If a requested folder responsive to the collection request is not listed, the collection may be re-run with a folder listed in the text file. If a search already exists for the targeted collection, the search is automatically deleted and recreated. Once an export is created, the table in the tracking database 218 is updated with the job status (e.g., in the form of successful or failure with a reason specified). If the export is successful, the forensic staging robot(s) 208 are automatically triggered to connect for downloading the exported data.

The forensic staging robot(s) 208 generally use automation to copy a unique export key, paste the export key into a download window of the platform 104 and specify the target location 212. In one implementation, the forensic staging robot 208 is triggered in connection with a collection request, and a job for the collection request is added to a queue using a script. Once the job is added to the queue, the electronic discovery manager 102 determines whether the collection request is a new request or a rerun of a previous request by querying the tracking database 218 for an automation identification associated with the job. If the collection request is a re-run, a container status is set to "Pending" and all data is purged from the record and the status is set to "Added to Queue." If the collection request is a new request, the record metadata is updated and the status is set to "Added to Queue."

In one implementation, the workflow engine 206 generates a schedule that allocates jobs for collection requests dynamically between the forensic staging robots 208. For example, the workflow engine 206 may dynamically allocate jobs between two (or some other number) of the forensic staging robots 208 using a continuous schedule that runs on regular intervals (e.g., every x minutes, hours, days, weeks, months, or custom) to check the queue for transactions. The schedule may be turned off if desired, and if one of the forensic staging robots 208 is occupied with allocating the schedule, the job is added to the queue so that the robot will process the next transition in the queue within the same iteration. The schedule may further include a maximum time for a job to run before it is terminated. Additionally, the forensic staging robots 208 may automatically retry a request one or more times.

A collection procedure compilation may query the tracking database 218 periodically (e.g., every other minute) for any outstanding jobs without a status of "Successful," "N/A," "Failed," "Faulted," "Abandoned," or other particular designation indicating that a job is not outstanding. If any jobs are found to be outstanding, the collection procedure compilation queries the forensic staging robots 208 using the script to obtain a status of the job, and the status is updated in the tracking database 218. In one example, the statuses may include: "New" indicating a job has been added to the queue; "Pending" meaning that the job is awaiting allocation to one of the forensic staging robots 208; "Queued" indicating that the job has been sent but not yet scheduled; "Added to the Queue" meaning that the job is in the schedule but not yet running: "In Progress" meaning that the job is running on one of the forensic staging robots 208 or awaiting a status update in the tracking database 218; "Successful" indicating that the job has successfully concluded; "Faulted" meaning that the job failed; and "Abandoned" indicating that the job was at a "Faulted" status for a predetermine period of time.

In one implementation, the forensic system 206 initiates creation of the forensic containers 216 using a forensic imager command line following export of the responsive data collection. In one implementation, an image of the responsive data collection is created in the staging area 214. In some cases, for example with respect to online services associated with the platform 104, a script is utilized to create an image path prior to execution. Where the request is a rerun, a max modified data on an automatically created date folder is used. The staging folder for personal and shared drives may be passed in from a database query.

The forensic robots 210 may be triggered based on the workflow engine 204 by querying the tracking database 218 periodically (e.g., every few minutes) for jobs that have a status as "Successful" or "N/A" or a container status as "Pending." The collection procedure compilation may send a job to the forensic staging robots 208 to add the job to a queue using the script. The queue name for the process may correspond to the forensic imaging and the container status will change from "Pending" to "Added to Queue." A schedule for the forensic system 206 may run periodically to dynamically allocate jobs between the forensic robots 210. Once the schedule for the forensic system 206 initiates the job, the status changes depending on the status of the forensic robot 210 associated with the job. If the robot is busy, the status is changed to "Queued," and if the robot starts the job, the status changes to "In Progress." In one implementation, the forensic robot 210 launches forensic imaging and iterates through the prompts utilizing shortcuts and optical character recognition for validation and error handling. Once the imaging process is complete, a script completes the job transaction from the forensic robot 210.

The collection procedure compilation process runs every few minutes, in one implementation, to capture any outstanding imaging jobs and query the tracking database 218 for the status, which may be updated. In one example, the statuses may include: "New" indicating a job has been added to the queue; "Pending" meaning that the job is awaiting allocation to one of the forensic robots 210; "Queued" indicating that the job has been sent but not yet scheduled; "Added to the Queue" meaning that the job is in the schedule but not yet running: "In Progress" meaning that the job is running on one of the forensic robots 210 or awaiting a status update in the tracking database 218; "Successful" indicating that the job has successfully concluded; "Faulted" meaning that the job failed; and "Abandoned" indicating that the job was at a "Faulted" status for a predetermine period of time.

Thus, the electronic discovery management system 200 includes memory including the staging area 214 in the target location 212, with a staging path from the source(s) 202 to the staging area 214 in the target location 212 being automatically generated in connection with a collection request. A folder hierarchy may be generated in connection with generation of the staging path, with the folder hierarchy including a staging folder and an image folder within a request folder. The forensic staging robot(s) 208 capture criteria for the collection request and an encrypted export key automatically, and the forensic staging robots 208 generate an automated export command for collecting a responsive data collection from the source(s) 202. The automated export command is generated using the criteria for the collection request and the encrypted export key. The responsive data collection is downloaded along the staging path in response to the automated export command. In one implementation, the criteria for the collection request includes a collection matter, a custodian identification, a custodian device type, and/or the like. The custodian device type may include a personal information manager, a file hosting service, a web-based collaborative platform, a private storage drive, a shared storage drive, and/or the like.

In one implementation, the forensic robots 210 generate an automated image command for generating an image of the responsive data collection in the target location 212. The automated image command may be generated based on an image path, and the collection request is fulfilled by triggering a compression of the image of the responsive data collection into the forensic containers 216. The process tracking database 218 may storing store one or more tracking reports providing an updated status of downloading the responsive data collection. The forensic robots 210 may be triggered based on the one or more tracking reports.

Figure 3:
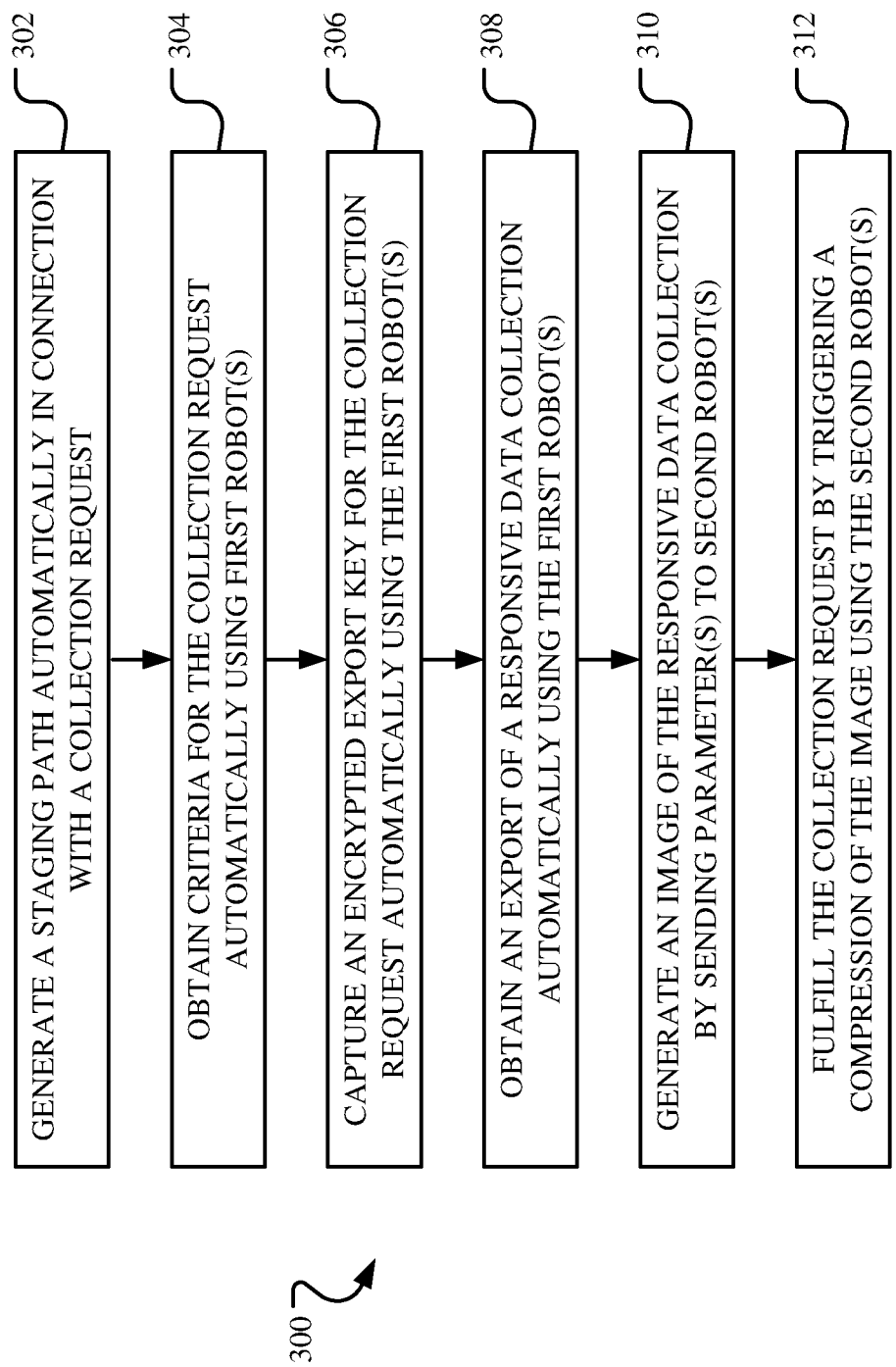
FIG. 3 shows example operations for electronic discovery management.

Turning to FIG. 3, example operations 300 for electronic discovery management are illustrated. In one implementation, an operation 302 generates a staging path from at least one source to a staging area in a target location automatically in connection with a collection request. A folder hierarchy may be generated in connection with generation of the staging path, and the folder hierarchy including a staging folder and an image folder within a request folder. An operation 304 obtains criteria for the collection request automatically using a first robot. The criteria for the collection request may include a collection matter, a custodian identification, a custodian device type, and/or the like. The custodian device type includes, without limitation, a personal information manager, a file hosting service, a web-based collaborative platform, a private storage drive, a shared storage drive, and/or the like.

An operation 306 captures an encrypted export key for the collection request using the first robot. An operation 308 obtains an export of a responsive data collection automatically from the at least one source using the first robot. In one implementation, a validity of the staging path is verified prior to obtaining the export. The responsive data collection is exported along the staging path based on the criteria for the collection request and the encrypted export key. An operation 310 generates an image of the responsive data collection in the target location by sending one or more parameters to a second robot, and an operation 312 fulfils the collection request by triggering a compression of the image of the responsive data collection into one or more forensic containers using the second robot. An integrity of the image of the responsive data may be verified through a comparison of the responsive data collection at the at least one source against the target location. One or more reports may be generated based on the comparison of the responsive data collection at the at least one source against the target location, and the one or more reports may be complied in a process tracking database. In one implementation, a status of the export of the responsive data collection may be tracked, and the status of the export of the responsive data collection may be presented.

Figure 4:
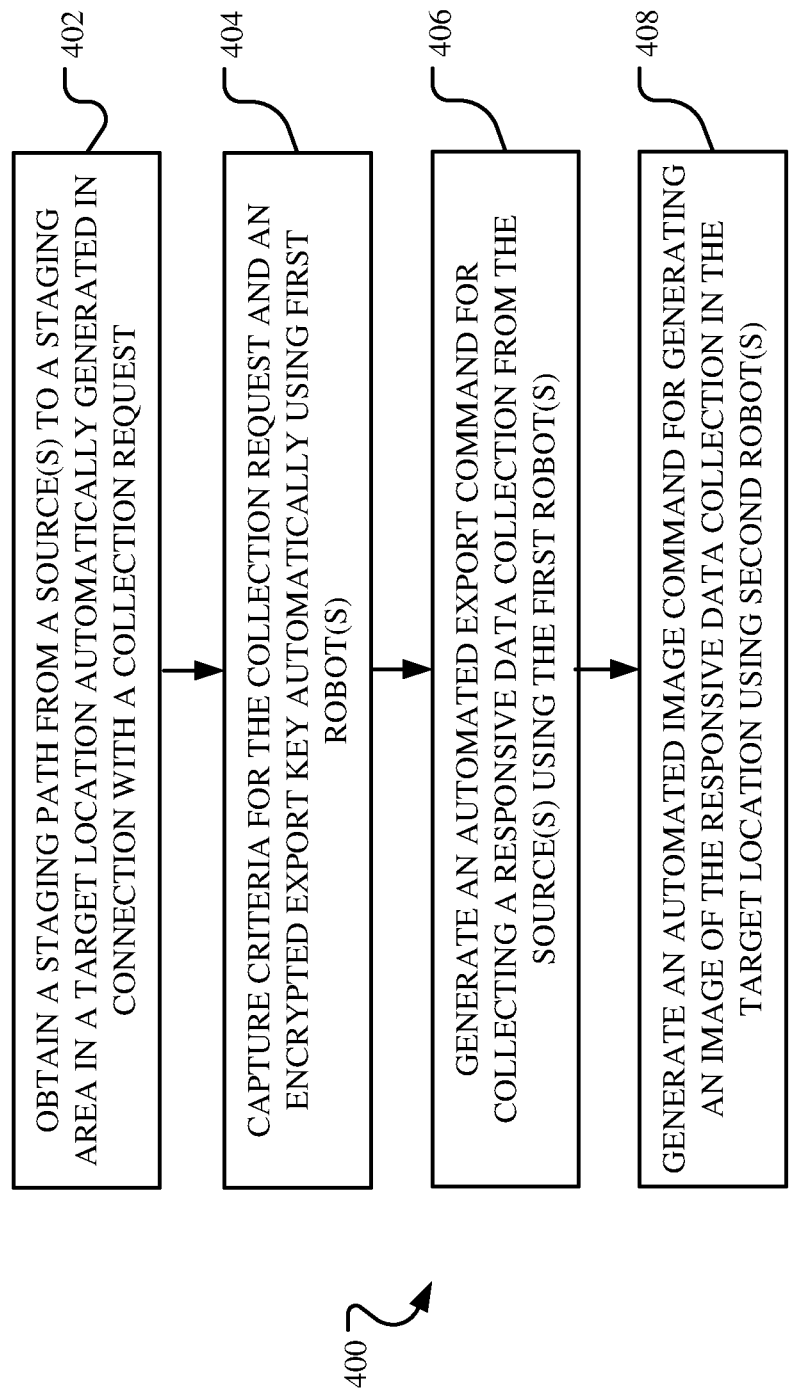
FIG. 4 illustrates example operations for electronic discovery management.

Turning to FIG. 4, example operations 400 for electronic discovery management are illustrated. In one implementation, an operation 402 obtains a staging path from at least one source to a staging area in a target location automatically generated in connection with a collection request. An operation 404 captures criteria for the collection request and an encrypted export key automatically using one or more first robots, and an operation 406 generates an automated export command for collecting a responsive data collection from the at least one source using the one or more first robots. The automated export command is generated using the criteria for the collection request and the encrypted export key. The responsive data collection is downloaded along the staging path in response to the automated export command. The responsive data collection may be downloaded along the staging path in response to the automated export command based on a queue. One or more requests within the queue may be automatically allocated among the one or more first robots using a continuous schedule.

An operation 408 generates an automated image command for generating an image of the responsive data collection in the target location using one or more second robots. The automated image command is generated based on an image path. The collection request fulfilled by triggering a compression of the image of the responsive data collection into one or more forensic containers using the one or more second robots. The image of the responsive data collection may be generated in the target location according to the automated image command and a queue. In one implementation, one or more requests within the queue are automatically allocated among the one or more second robots.

One or more tracking reports providing an updated status of downloading the responsive data collection may be generated. The one or more tracking reports may be stored in a process tracking database. In one implementation, the one or more second robots are triggered based on the one or more tracking reports stored in the process tracking database. The process tracking database may be regularly queried for outstanding requests.

Figure 5:
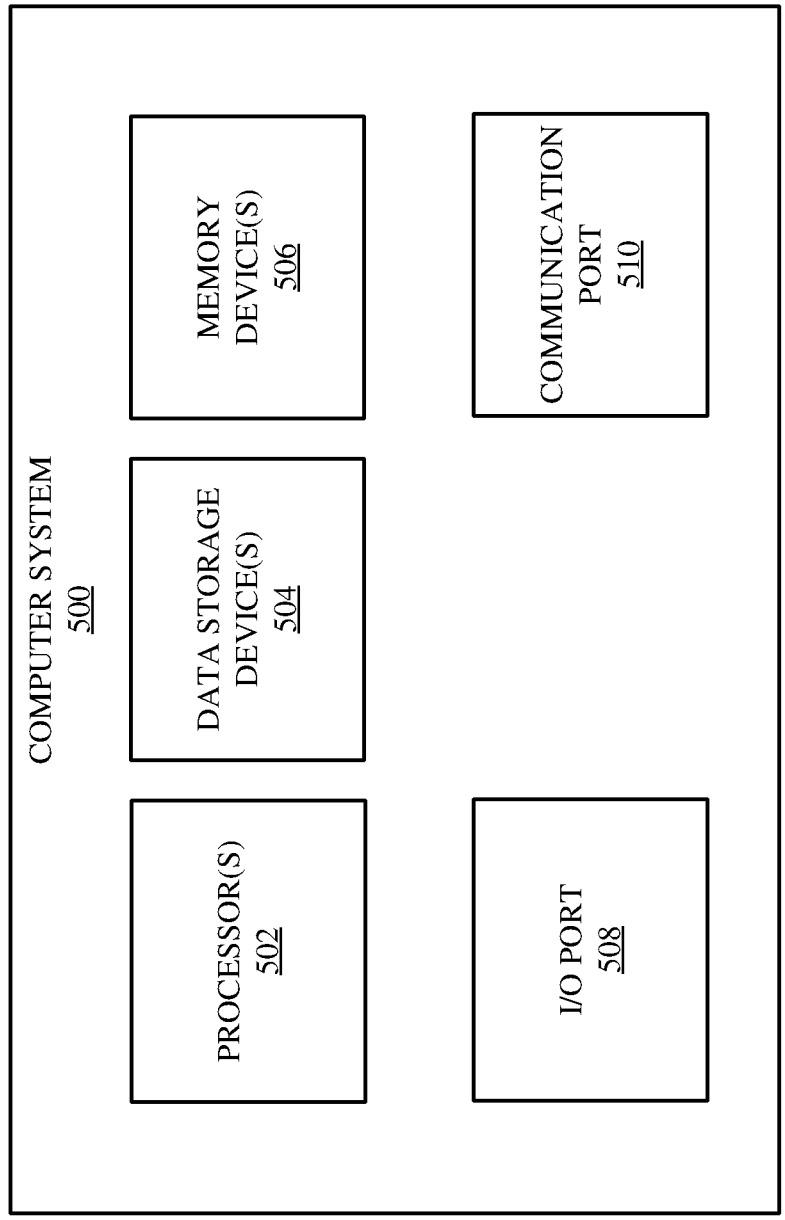
FIG. 5 depicts an example computing system that may implement various systems and methods discussed herein.

Referring to FIG. 5, a detailed description of an example computing system 500 having one or more computing units that may implement various systems and methods discussed herein is provided. The computing system 500 may be applicable to the electronic discovery manager 102, the user devices 104, the server 108, any of the computing components of the electronic discovery management system 200, and other computing or network devices. It will be appreciated that specific implementations of these devices may be of differing possible specific computing architectures not all of which are specifically discussed herein but will be understood by those of ordinary skill in the art.

The computer system 500 may be a computing system is capable of executing a computer program product to execute a computer process. Data and program files may be input to the computer system 500, which reads the files and executes the programs therein. Some of the elements of the computer system 500 are shown in FIG. 5, including one or more hardware processors 502, one or more data storage devices 504, one or more memory devices 508, and/or one or more ports 508-510. Additionally, other elements that will be recognized by those skilled in the art may be included in the computing system 500 but are not explicitly depicted in FIG. 5 or discussed further herein. Various elements of the computer system 500 may communicate with one another by way of one or more communication buses, point-to-point communication paths, or other communication means not explicitly depicted in FIG. 5.

The processor 502 may include, for example, a central processing unit (CPU), a microprocessor, a microcontroller, a digital signal processor (DSP), and/or one or more internal levels of cache. There may be one or more processors 502, such that the processor 502 comprises a single central-processing unit, or a plurality of processing units capable of executing instructions and performing operations in parallel with each other, commonly referred to as a parallel processing environment.

The computer system 500 may be a conventional computer, a distributed computer, or any other type of computer, such as one or more external computers made available via a cloud computing architecture. The presently described technology is optionally implemented in software stored on the data stored device(s) 504, stored on the memory device(s) 506, and/or communicated via one or more of the ports 508-510, thereby transforming the computer system 500 in FIG. 5 to a special purpose machine for implementing the operations described herein. Examples of the computer system 500 include personal computers, terminals, workstations, mobile phones, tablets, laptops, personal computers, multimedia consoles, gaming consoles, set top boxes, and the like.

The one or more data storage devices 504 may include any non-volatile data storage device capable of storing data generated or employed within the computing system 500, such as computer executable instructions for performing a computer process, which may include instructions of both application programs and an operating system (OS) that manages the various components of the computing system 500. The data storage devices 504 may include, without limitation, magnetic disk drives, optical disk drives, solid state drives (SSDs), flash drives, and the like. The data storage devices 504 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 506 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 504 and/or the memory devices 506, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 500 includes one or more ports, such as an input/output (I/O) port 508 and a communication port 510, for communicating with other computing, network, or vehicle devices. It will be appreciated that the ports 508-510 may be combined or separate and that more or fewer ports may be included in the computer system 500.

The I/O port 508 may be connected to an I/O device, or other device, by which information is input to or output from the computing system 500. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 500 via the I/O port 508. Similarly, the output devices may convert electrical signals received from computing system 500 via the I/O port 508 into signals that may be sensed as output by a human, such as sound, light, and/or touch. The input device may be an alphanumeric input device, including alphanumeric and other keys for communicating information and/or command selections to the processor 502 via the I/O port 508. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 500 via the I/O port 508. For example, an electrical signal generated within the computing system 500 may be converted to another type of signal, and/or vice-versa. In one implementation, the environment transducer devices sense characteristics or aspects of an environment local to or remote from the computing device 500, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 500, such as, physical movement of some object (e.g., a mechanical actuator), heating or cooling of a substance, adding a chemical substance, and/or the like.

In one implementation, a communication port 510 is connected to a network by way of which the computer system 500 may receive network data useful in executing the methods and systems set out herein as well as transmitting information and network configuration changes determined thereby. Stated differently, the communication port 510 connects the computer system 500 to one or more communication interface devices configured to transmit and/or receive information between the computing system 500 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 510 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 510 may communicate with an antenna or other link for electromagnetic signal transmission and/or reception.

In an example implementation, electronic discovery management operations, tracking operations, responsive data collections, cloud-based services, and software and other modules and services may be embodied by instructions stored on the data storage devices 504 and/or the memory devices 506 and executed by the processor 502.

The system set forth in FIG. 5 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for electronic discovery management, the method comprising:
    generating a staging path from at least one source to a staging area in a target location automatically in connection with a collection request;
    determining whether the collection request is a new request or a rerun request of a previous request by querying a process tracking database, wherein all data is removed from a staging folder associated with the staging area if the collection request is the rerun request;
setting a status of one or more forensic containers based on whether the collection request is determined to be the new request or the rerun request;
    obtaining criteria for the collection request automatically using a first robot;
    capturing an encrypted export key for the collection request using the first robot;
    obtaining an export of a responsive data collection automatically from the at least one source using the first robot, the responsive data collection exported along the staging path based on a queue, the criteria for the collection request, and the encrypted export key, one or more requests within the queue being automatically allocated to the first robot using a continuous schedule;
    generating an image of the responsive data collection in the target location by sending one or more parameters to a second robot; and
    fulfilling the collection request by triggering a compression of the image of the responsive data collection into the one or more forensic containers using the second robot, wherein the first and second robots are deployed in a Virtual Desktop Infrastructure environment.

2. The method of claim 1, further comprising:
    verifying a validity of the staging path prior to obtaining the export.

3. The method of claim 1, wherein the criteria for the collection request includes one or more of a collection matter, a custodian identification, and a custodian device type.

4. The method of claim 3, wherein the custodian device type includes at least one of a personal information manager, a file hosting service, a web-based collaborative platform, a private storage drive, or a shared storage drive.

5. The method of claim 1, wherein a folder hierarchy is generated in connection with generation of the staging path, the folder hierarchy including the staging folder and an image folder within a request folder.

6. The method of claim 1, further comprising:
verifying an integrity of the image of the responsive data collection through a comparison of the responsive data collection at the at least one source against the target location.

7. The method of claim 6, further comprising:
generating one or more reports based on the comparison of the responsive data collection at the at least one source against the target location; and
compiling the one or more reports in the process tracking database.

8. The method of claim 1, further comprising:
tracking a status of the export of the responsive data collection; and
presenting the status of the export of the responsive data collection.

9. One or more non-transitory computer-readable storage media storing computer-executable instructions for performing a computer process on a computing system, the computer process comprising:
obtaining a staging path from at least one source to a staging area in a target location automatically generated in connection with a collection request;
determining whether the collection request is a new request or a rerun request of a previous request by querying a process tracking database, wherein all data is removed from a staging folder associated with the staging area if the collection request is the rerun request;
setting a status of one or more forensic containers based on whether the collection request is determined to be the new request or the rerun request;
capturing criteria for the collection request and an encrypted export key automatically using one or more first robots;
generating an automated export command for collecting a responsive data collection from the at least one source using the one or more first robots, the automated export command generated using the criteria for the collection request and the encrypted export key, the responsive data collection downloaded along the staging path in response to the automated export command based on a queue, wherein one or more requests within the queue are automatically allocated among the one or more first robots using a continuous schedule; and
generating an automated image command for generating an image of the responsive data collection in the target location using one or more second robots, the automated image command generated based on an image path, the collection request fulfilled by triggering a compression of the image of the responsive data collection into the one or more forensic containers using the one or more second robots,
wherein the one or more first and second robots are deployed in a Virtual Desktop Infrastructure environment.

10. The one or more non-transitory computer-readable storage media of claim 9, further comprising:
generating one or more tracking reports providing an updated status of downloading the responsive data collection, the one or more tracking reports stored in the process tracking database; and
triggering the one or more second robots based on the one or more tracking reports stored in the process tracking database.

11. The one or more non-transitory computer-readable storage media of claim 9, wherein the process tracking database is regularly queried for outstanding requests.

12. The one or more non-transitory computer-readable storage media of claim 9, wherein the image of the responsive data collection is generated in the target location according to the automated image command and the queue.

13. The one or more non-transitory computer-readable storage media of claim 12, wherein one or more requests within the queue are automatically allocated among the one or more second robots.

14. A system for electronic discovery management, the system comprising:
memory including a staging area in a target location, a staging path from at least one source to the staging area in the target location being automatically generated in connection with a collection request;
one or more processors querying a process tracking database to determine if the collection request is a new request or a rerun request of a previous request, wherein all data is removed from a staging folder associated with the staging area if the collection request is the rerun request and a status of one or more forensic containers is set based on whether the collection request is determined to be the new request or the rerun request;
one or more first robots capturing criteria for the collection request and an encrypted export key automatically, the one or more first robots generating an automated export command for collecting a responsive data collection from the at least one source, the automated export command generated using the criteria for the collection request and the encrypted export key, the responsive data collection downloaded along the staging path in response to the automated export command based on a queue, and requests within the queue being automatically allocated among the one or more first robots using a continuous schedule; and
one or more second robots generating an automated image command for generating an image of the responsive data collection in the target location, the automated image command generated based on an image path, the collection request fulfilled by triggering a compression of the image of the responsive data collection into the one or more forensic containers, wherein the one or more first and second robots are deployed in a Virtual Desktop Infrastructure environment.

15. The system of claim 14, wherein the criteria for the collection request includes one or more of a collection matter, a custodian identification, and a custodian device type.

16. The system of claim 15, wherein the custodian device type includes at least one of a personal information manager, a file hosting service, a web-based collaborative platform, a private storage drive, or a shared storage drive.

17. The system of claim 14, wherein a folder hierarchy is generated in connection with generation of the staging path, the folder hierarchy including the staging folder and an image folder within a request folder.

18. The system of claim 14, wherein:
the process tracking database stores one or more tracking reports providing an updated status of downloading the responsive data collection, the one or more second robots triggered based on the one or more tracking reports.

* * * * *